United States Patent
Choi et al.

(10) Patent No.: US 12,315,901 B2
(45) Date of Patent: May 27, 2025

(54) BATTERY MODULE FOR SECONDARY BATTERY AND BATTERY PACK INCLUDING THE SAME

(71) Applicant: SK INNOVATION CO., LTD., Seoul (KR)

(72) Inventors: Young Sun Choi, Daejeon (KR); Seung Hoon Ju, Daejeon (KR); Ji Seok Lee, Daejeon (KR)

(73) Assignee: SK INNOVATION CO., LTD., Seoul (KR)

( * ) Notice: Subject to any disclaimer, the term of this patent is extended or adjusted under 35 U.S.C. 154(b) by 0 days.

(21) Appl. No.: 17/952,985

(22) Filed: Sep. 26, 2022

(65) Prior Publication Data

US 2024/0106030 A1 Mar. 28, 2024

Related U.S. Application Data

(63) Continuation of application No. 16/135,783, filed on Sep. 19, 2018, now Pat. No. 11,489,215.

(51) Int. Cl.
| | | |
|---|---|---|
| *H01M 10/613* | (2014.01) | |
| *H01M 10/625* | (2014.01) | |
| *H01M 10/647* | (2014.01) | |
| *H01M 10/6551* | (2014.01) | |
| *H01M 10/6554* | (2014.01) | |

(Continued)

(52) U.S. Cl.
CPC ....... *H01M 10/613* (2015.04); *H01M 10/625* (2015.04); *H01M 10/647* (2015.04); *H01M 10/6551* (2015.04); *H01M 10/6554* (2015.04); *H01M 10/6555* (2015.04); *H01M 10/6556* (2015.04); *H01M 10/6557* (2015.04); *H01M 10/6568* (2015.04); *H01M 50/244* (2021.01); *H01M 50/249* (2021.01); *H01M 50/209* (2021.01); *H01M 50/271* (2021.01); *H01M 50/296* (2021.01); *H01M 2220/20* (2013.01)

(58) Field of Classification Search
CPC ............ H01M 10/613; H01M 10/625; H01M 10/647; H01M 10/6551; H01M 10/6554; H01M 10/6556; H01M 10/6568
See application file for complete search history.

(56) References Cited

U.S. PATENT DOCUMENTS

| | | | |
|---|---|---|---|
| 2005/0170243 A1* | 8/2005 | Ozawa | H01M 50/55 29/623.5 |
| 2012/0028099 A1* | 2/2012 | Aoki | H01M 10/643 429/120 |

(Continued)

FOREIGN PATENT DOCUMENTS

| | | |
|---|---|---|
| CN | 102893449 A | 1/2013 |
| KR | 10-2010-0041452 A | 4/2010 |

(Continued)

OTHER PUBLICATIONS

Office Action for Korean Patent Application No. 10-2017-0121192 issued by the Korean Patent Office on Apr. 14, 2021.

(Continued)

*Primary Examiner* — Nathanael T Zemui
(74) *Attorney, Agent, or Firm* — IP & T GROUP LLP (57) ABSTRACT

Provided are a battery module for a secondary battery, and a battery pack including the battery module. In the battery module, battery cells are horizontally stacked.

11 Claims, 9 Drawing Sheets

(51) Int. Cl.
  *H01M 10/6555*   (2014.01)
  *H01M 10/6556*   (2014.01)
  *H01M 10/6557*   (2014.01)
  *H01M 10/6568*   (2014.01)
  *H01M 50/244*    (2021.01)
  *H01M 50/249*    (2021.01)
  *H01M 50/209*    (2021.01)
  *H01M 50/271*    (2021.01)
  *H01M 50/296*    (2021.01)

(56) References Cited

U.S. PATENT DOCUMENTS

| | | | | |
|---|---|---|---|---|
| 2012/0107635 | A1* | 5/2012 | Hirsch | H01M 10/658 428/68 |
| 2012/0183823 | A1* | 7/2012 | Von Borck | H01M 10/663 429/81 |
| 2013/0164578 | A1* | 6/2013 | Sweet | H01M 10/0481 429/82 |
| 2015/0037647 | A1* | 2/2015 | Nguyen | H01M 10/6555 429/120 |
| 2018/0175464 | A1* | 6/2018 | Kim | H01M 10/6555 |
| 2018/0269544 | A1* | 9/2018 | Choi | H01M 50/211 |

FOREIGN PATENT DOCUMENTS

| | | |
|---|---|---|
| KR | 10-2011-0059353 A | 6/2011 |
| KR | 10-2013-0008142 A | 1/2013 |
| KR | 10-2014-0034352 A | 3/2014 |
| KR | 20-2014-0002779 U | 5/2014 |
| KR | 10-2015-0104550 A | 9/2015 |
| KR | 20160050492 A | 5/2016 |

OTHER PUBLICATIONS

Office Action for Korean Patent Application No. 10-2017-0121192 issued by the Korean Patent Office on Dec. 14, 2021.
Office Action for Korean Patent Application No. 10-2022-0090951 issued by the Korean Patent Office on Aug. 31, 2022.
Office Action for the Chinese Patent Application No. 201811098716.4 issued by the Chinese Patent Office on Dec. 31, 2021.
Office Action for the Korean Patent Application No. 10-2022-0090951 issued by the Korean Patent Office on Sep. 27, 2023.

* cited by examiner

BATTERY MODULE FOR SECONDARY BATTERY AND BATTERY PACK INCLUDING THE SAME

CROSS-REFERENCE TO RELATED APPLICATIONS

This application is a continuation of U.S. patent application Ser. No. 16/135,783 filed on Sep. 19, 2018, which claims priority under 35 U.S.C. § 119 to Korean Patent Application No. 10-2017-0121192, filed on Sep. 20, 2017, in the Korean Intellectual Property Office, the disclosure of which is incorporated herein by reference in its entirety.

TECHNICAL FIELD

The following disclosure relates to a battery module for a secondary battery and a battery pack including the battery module, and more particularly, to a battery module for a secondary battery in which battery cells are horizontally stacked, and a battery pack including the battery module.

BACKGROUND

Recently, electric vehicles that are zero-emission vehicles are attracting attention in order to prevent air pollution due to harmful components of internal combustion engine vehicles.

Substantially, a secondary battery having a high performance, such as a high energy density, a high output density, a long life, a weight lightening, and the like, is essential for driving an electric vehicle. To this end, lead secondary batteries, lithium secondary batteries, alkali secondary batteries, metal-air secondary batteries, fuel secondary batteries, and the like are being developed or used. In addition, since a performance of a single secondary battery is insufficient, a plurality of secondary batteries are connected in series and configured and used to generate a voltage as high as a few hundreds of volts. In each of the secondary batteries, a terminal of a positive electrode and a terminal of a negative electrode are generally fixed and mounted, and a plurality of secondary batteries are integrated into one tray and are being used.

Recently, batteries applied to electric vehicles are being continuously required to become lighter in weight and smaller in size. To this end, battery packs tend to be gradually reduced in size. In particular, actually, a requirement for a height of a battery pack is gradually lowered due to a characteristic of an electric vehicle aimed at a low body height thereof in order to reduce an air resistance coefficient.

To reduce a height of a battery pack, a horizontal stacking manner of horizontally stacking battery cells needs to be applied instead of a general manner of vertically stacking battery cells. Thus, there is a desire for a change in a cooling manner to cool a battery cell.

SUMMARY

An exemplary embodiment of the present disclosure is directed to providing a battery module for a secondary battery in which battery cells are horizontally stacked, and a battery pack including the battery module, to enhance a cooling effect while reducing a height of the battery pack by applying a water-cooling manner with an excellent cooling performance to cool the battery module.

In one general aspect, there is provided a battery module for a secondary battery in which at least one sub-module including a battery cell is stacked in a vertical direction, the battery module including a cooling part including a cooling fin inserted between the battery cell and a neighboring battery cell to cool the sub-module, and a cooling body disposed on a side surface of the sub-module and coupled to the cooling fin to meet an end portion of the cooling fin, wherein in the cooling part, a refrigerant is supplied and recovered to the cooling body.

The sub-module may include at least one battery cell and a cell frame to which the battery cell is fixed, and the battery cell may be disposed on the cell frame in a horizontal direction.

The cooling body may include a cooling plate coupled in contact with the cooling fin, and a cooling pipe through which the refrigerant is supplied and recovered and that is brazing-coupled to the cooling plate.

The cooling plate may be a heat sink.

The cooling fin and the cooling plate may be coupled with a bolt, and the bolt may be fixed to the cooling fin by passing a space in which the cooling pipe is not coupled on the cooling plate.

The cooling pipe may include a plurality of main pipes disposed in a vertical direction, and sub-pipes that connect ends of the plurality of main pipes so that the plurality of main pipes are connected in series.

In the cooling pipe, an inflow part that receives a supply of a refrigerant and an outflow part that recovers a refrigerant may be individually formed. The inflow part may be formed in a lowermost main pipe among the main pipes, and the outflow part may be formed in an uppermost main pipe among the main pipes.

A pair of cooling bodies may be disposed on both side surfaces of a stacked battery cell, respectively. The cooling body may include an inflow part formed in an inflow end of a first cooling pipe disposed on one side surface of the battery cell, an outflow part formed in an outflow end of a second cooling pipe disposed on another side surface of the battery cell, and a connection pipe that connects an outflow end of the first cooling pipe and an inflow end of the second cooling pipe.

The inflow part may be formed in a lowermost main pipe among main pipes of the first cooling pipe, and the outflow part may be formed in an uppermost main pipe among main pipes of the second cooling pipe. The connection pipe may connect an uppermost main pipe among the main pipes of the first cooling pipe and a lowermost main pipe among the main pipes of the second cooling pipe.

In another general aspect, there is provided a battery pack for a secondary battery, including the above-described battery module, and a pack case in which the battery module is accommodated.

The battery module may include an inflow part in which a refrigerant flow, and an outflow part in which a refrigerant is recovered, and the inflow part and the outflow part may be formed to extend so that an end portion of the battery module is exposed to the outside of the pack case when the battery module is accommodated in the pack case.

DETAILED DESCRIPTION OF EMBODIMENTS

Hereinafter, a battery module according to an exemplary embodiment of the present disclosure is described in detail with reference to the accompanying drawings.

Figure 1:
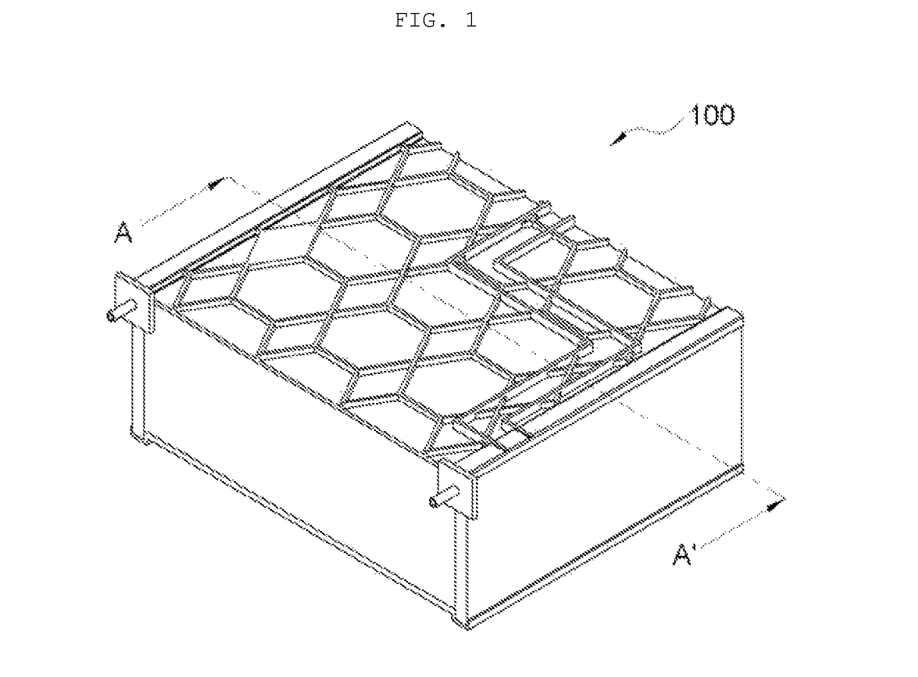
FIG. 1 is an overall perspective view of a battery module according to an exemplary embodiment of the present disclosure.
Figure 2:
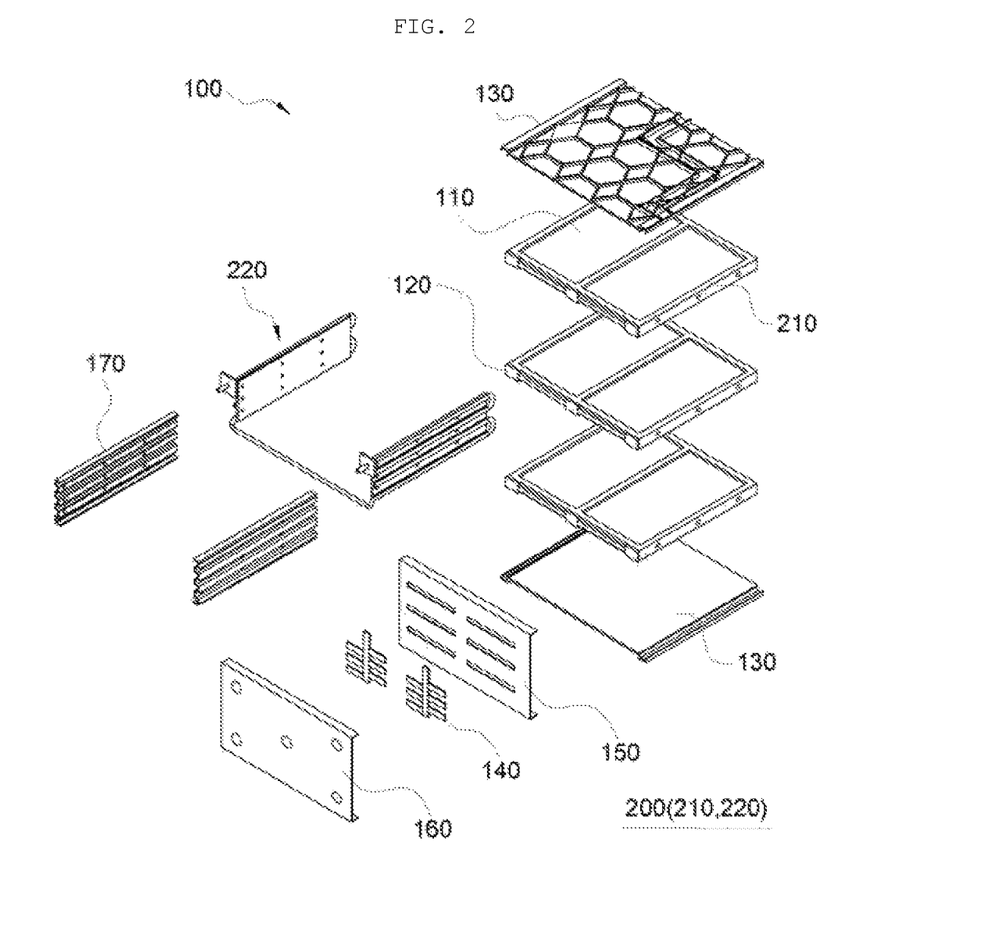
FIG. 2 is an exploded perspective view of a battery module according to an exemplary embodiment of the present disclosure.

FIG. 1 is an overall perspective view of a battery module 100 for a secondary battery according to an exemplary embodiment of the present disclosure, and FIG. 2 is an exploded perspective view of the battery module 100 for a secondary battery according to an exemplary embodiment of the present disclosure.

As shown in FIGS. 1 and 2, the battery module 100 is basically formed by stacking a plurality of sub-modules 110 and 120 in a vertical direction, that is, a longitudinal direction. The sub-modules 110 and 120 include, for example, a battery cell 110, and a cell frame 120 in which the battery cell 110 is fixed. The battery module 100 further includes a module cover 130 that covers one side and another side in a stacking direction of the sub-modules 110 and 120, a terminal 140 and a terminal frame 150 that are disposed in a side in which an electrode tab of the battery cell 110 is formed to electrically connect the battery cell 110, a module cap 160 that covers the terminal frame 150, and a side cover 170 that covers side surfaces of the sub-modules 110 and 120. Meanwhile, the battery cell 110 is disposed so that a plane direction is horizontal to the ground, and is stacked in a horizontal stacking manner in the vertical direction, that is, the longitudinal direction perpendicular to the ground, in order to reduce a height of the battery module 100.

Here, in the battery module 100, a cooling part 200 is disposed. The cooling part 200 includes a cooling fin 210 that is inserted into the cell frame 120 to cool the battery cell 110, and a cooling body 220 that is disposed on both side surfaces of the cell frame 120 orthogonal to a stacking direction of the cell frame 120.

The above configuration of the battery module 100 except the cooling part 200 is the same as or similar to a configuration applied to a typical battery module for a secondary battery. A feature of the battery module 100 of the present disclosure is the cooling part 200 for cooling the battery cell 110, and accordingly the cooling part 200 according to an exemplary embodiment of the present disclosure is described in detail with reference to the drawing below.

Figure 3:
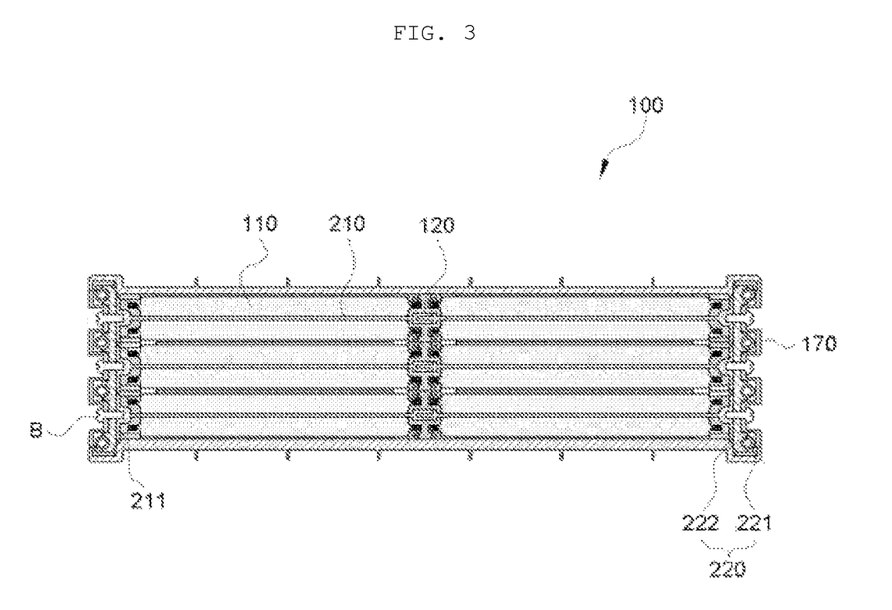
FIG. 3 is a cross-sectional view of a battery module according to an exemplary embodiment of the present disclosure, taken along line A-A' of FIG. 1.

FIG. 3 is a cross-sectional view of the battery module 100 according to an exemplary embodiment of the present disclosure.

As shown in the drawing, a pair of battery cells 110 may be fixed to one surface of the cell frame 120, and another pair of battery cells 110 may be fixed to another surface of the cell frame 120. In other words, a total of four battery cells 110 may be fixed. Although pairs of battery cells 110 are individually fixed as shown in the drawing, a single battery cell may be fixed.

Here, the cooling fin 210 may be inserted between the battery cell 110 fixed to the one surface of the cell frame 120 and the battery cell 110 fixed to the other surface of the cell frame 120. The cooling fin 210 is configured to cool the battery cell 110 by receiving cool air from the cooling body 220, and contact surfaces 211 are formed on both ends of the cooling fin 210 in a stacking direction of the battery cells 110. The contact surfaces 211 are in contact with the cooling body 220 and receive cool air of the cooling body 220.

The cooling body 220 is configured in a water-cooling manner of cooling the battery cell 110 using coolant. The cooling body 220 includes a refrigerant pipe 221 through which a refrigerant flows, and a cooling plate 222 to which the refrigerant pipe 221 is fixed. A pair of cooling bodies 220 may be disposed on both side surfaces of the cell frame 120, respectively, and the cooling plate 222 is configured to meet the cooling fin 210. Here, since the cooling body 220 of the present disclosure transfers heat to the cooling fin 210 using the refrigerant pipe 221, the cooling body 220 may couple the cooling plate 222 and the cooling fin 210 using a bolt B. In other words, since the bolt B is used to couple the cooling plate 222 and the cooling fin 210 in a space in which the refrigerant pipe 221 does not pass, the cooling plate 222 and the cooling fin 210 may be more firmly coupled. The cooling plate 222 may be formed of a material with a high thermal conductivity, and a heat dissipation function may be added. Thus, the cooling plate 222 may be, for example, a heat sink.

Figure 4:
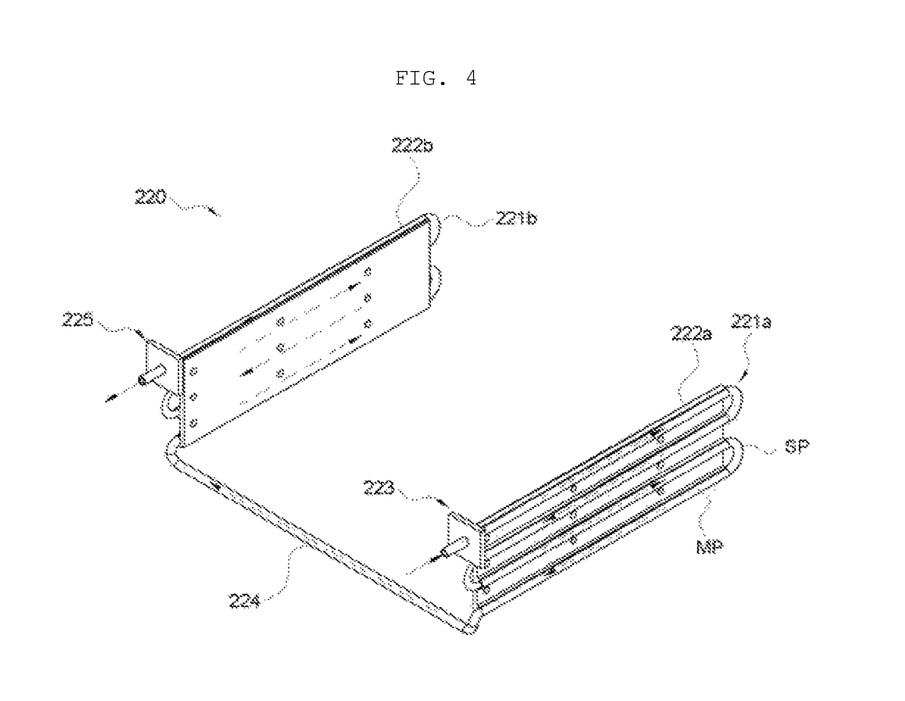
FIG. 4 is a perspective view of a cooling part according to a first exemplary embodiment of the present disclosure.
Figure 5:
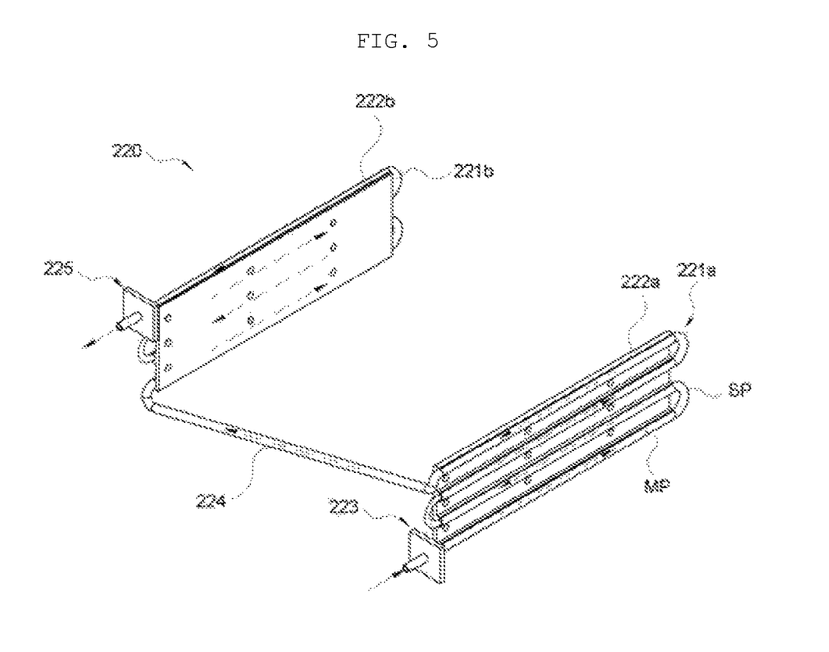
FIG. 5 is a perspective view of a cooling part according to a second exemplary embodiment of the present disclosure.
Figure 6:
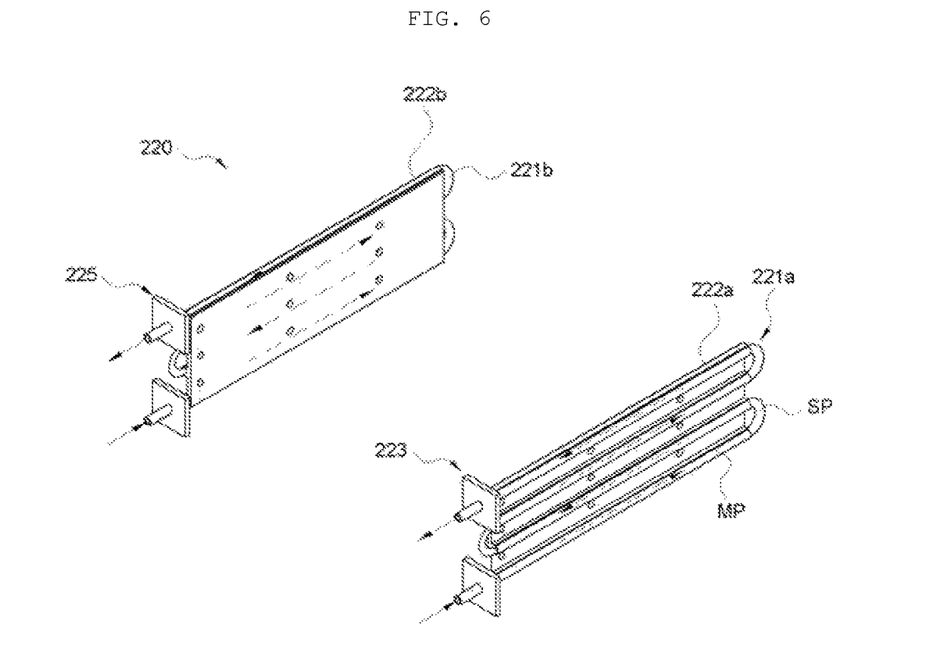
FIG. 6 is a perspective view of a cooling part according to a third exemplary embodiment of the present disclosure.

FIG. 4 is a perspective view of the cooling body 220 of the cooling part 200 according to an exemplary embodiment of the present disclosure.

As shown in the drawing, the cooling body 220 may be configured to include a first cooling plate 222a and a first cooling pipe 221a formed in one side in a side direction of the cell frame 120, a second cooling plate 222b and a second cooling pipe 221b formed in another side in the side direction of the cell frame 120, an inflow part 223 to allow a refrigerant to flow in an inlet side of the first cooling pipe 221a, a connection pipe 224 that connects an outlet side of the first cooling pipe 221a and an inlet side of the second cooling pipe 221b, and an outflow part 225 configured to recover a refrigerant in an outlet side of the second cooling pipe 221b.

The first and second cooling pipes 221a and 221b have the same shape, and accordingly a shape and an arrangement of the first cooling pipe 221a are described in detail below.

The first cooling pipe 221a may have an overall zigzag shape and may be fixed to the first cooling plate 221b. The first cooling pipe 221a includes a plurality of main pipes MP that are formed in a horizontal direction and that are spaced apart in a vertical direction, that is, a longitudinal direction, and sub-pipes SP that alternately connect ends of the main pipes MP so that each of the main pipes MP is connected in series. Based on the above configuration, generation of air in the first cooling pipe 221a may be maximally suppressed, thereby increasing a cooling efficiency.

In the present exemplary embodiment, the inflow part 223 is connected to an upper side of the first cooling pipe 221a, the connection pipe 224 is connected to a lower side of the first cooling pipe 221a and a lower side of the second cooling pipe 221b, and the outflow part 225 is connected to an upper side of the second cooling pipe 221b, as shown in the drawing.

However, generation of bubbles may be more efficiently suppressed when a refrigerant flows from bottom to top. Thus, the inflow part 223 may be connected to the lower side of the first cooling pipe 221a, the connection pipe 224 may be connected to the upper side of the first cooling pipe 221a and the lower side of the second cooling pipe 221b, and the outflow part 225 may be connected to the upper side of the second cooling pipe 221b, so that a refrigerant flowing in the first cooling pipe 221a may flow from bottom to top.

In another exemplary embodiment, each of the first cooling pipe 221a and the second cooling pipe 221b may be configured to allow a refrigerant to flow without a connection pipe. In other words, a first inflow part and a first outflow part may be formed in the lower side and the upper side of the first cooling pipe 221a, respectively, and a second inflow part and a second outflow part may be formed in the lower side and the upper side of the second cooling pipe 221b, respectively.

However, an exemplary embodiment of the cooling body 220 shown in the drawing may be desirable when considering a refrigerant efficiency as compared to productivity and maintenance of the battery module 100.

Hereinafter, a battery pack 1000 including the battery module 100 according to an exemplary embodiment of the present disclosure is described in detail with reference to the drawing.

Figure 7:
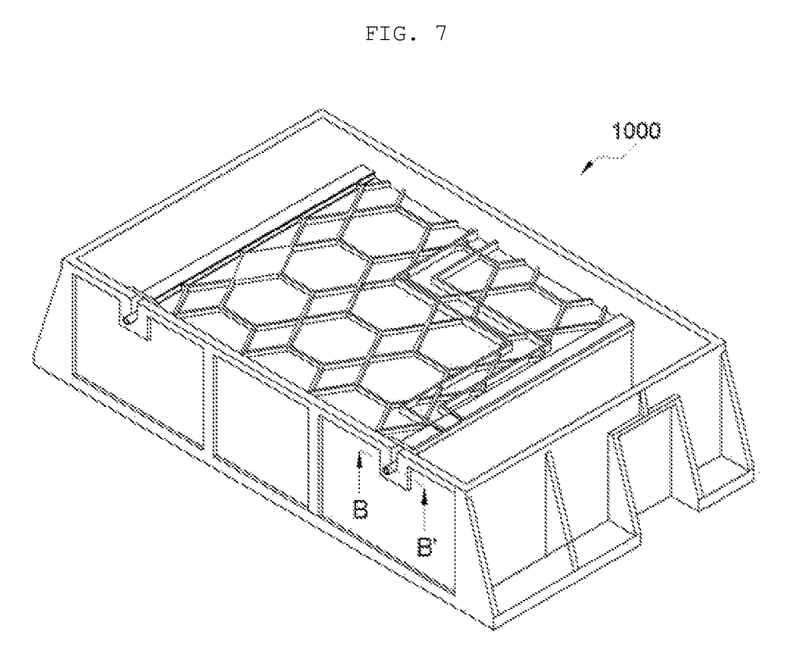
FIG. 7 is an overall perspective view of a battery pack including a battery module according to an exemplary embodiment of the present disclosure.
Figure 8:
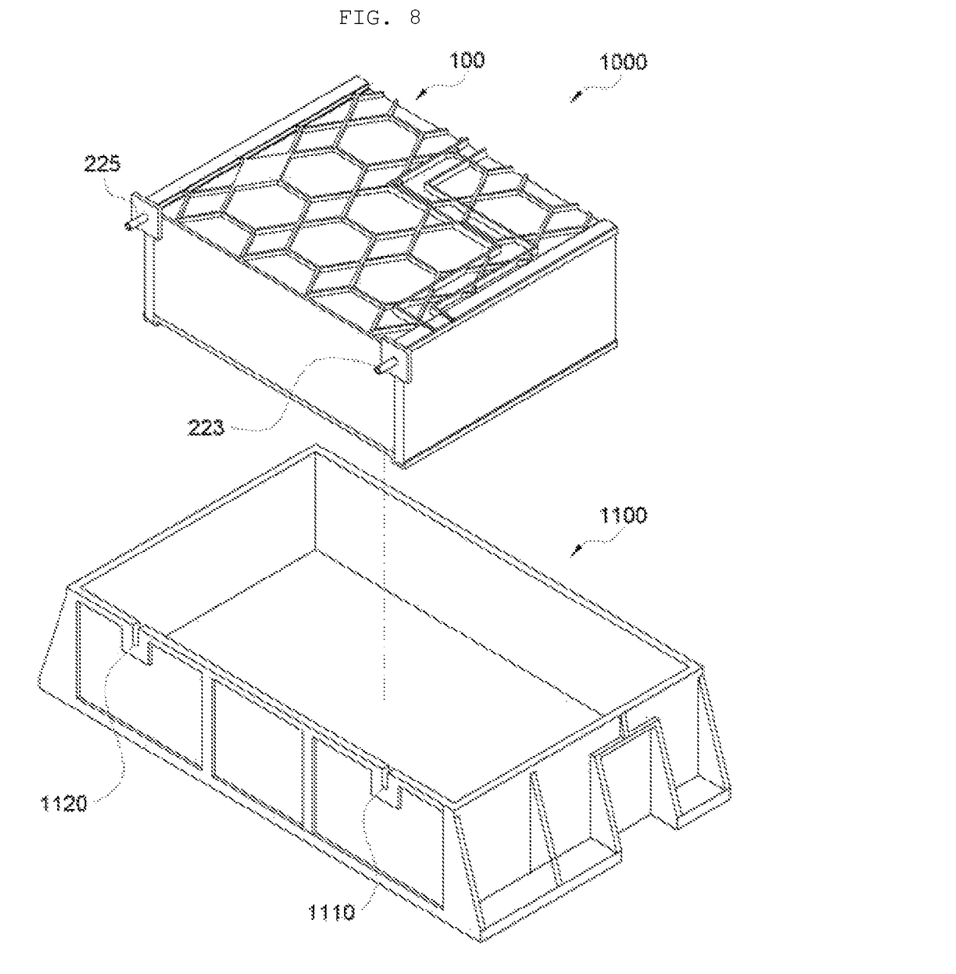
FIG. 8 is an exploded perspective view of a battery pack including a battery module according to an exemplary embodiment of the present disclosure.
Figure 9:
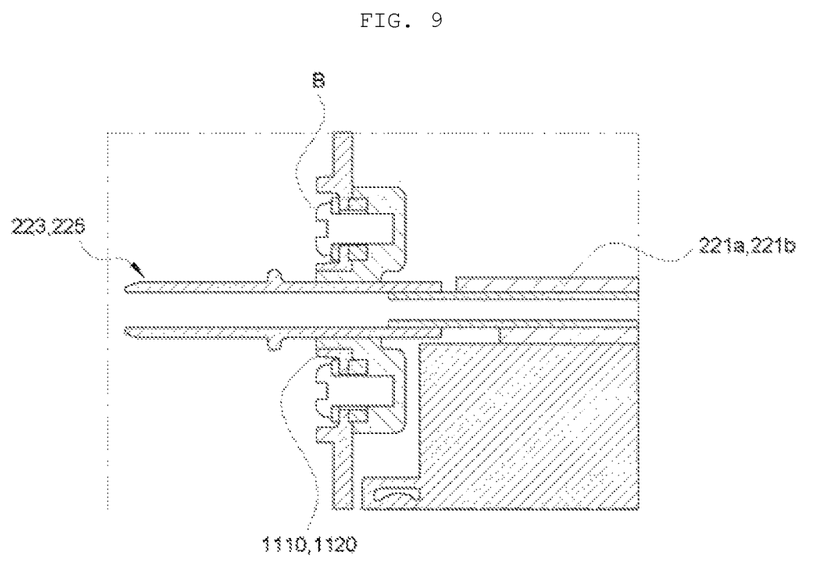
FIG. 9 is a cross-sectional view of a coupling portion of a cooling part and a pack case according to an exemplary embodiment of the present disclosure.

FIG. 7 is an overall perspective view of the battery pack 1000 according to an exemplary embodiment of the present disclosure, FIG. 8 is an exploded perspective view of the battery pack 1000 according to an exemplary embodiment of the present disclosure, and FIG. 9 is a cross-sectional view of a coupling portion of a pack case 1100 and the cooling part 200 of the battery module 100 according to an exemplary embodiment of the present disclosure.

As shown in the drawing, the battery pack 1000 according to an exemplary embodiment of the present disclosure is configured to include the above-described battery module 100 and the pack case 1100 in which the battery module 100 is accommodated. The pack case 1100 may have a space formed to accommodate the battery module 100, and may be formed to have an open top portion. (Although not shown in the drawing, the battery pack 1000 may include a pack cover (not shown) to seal the open top portion of the pack case 1100 after the battery module 100 is accommodated in the pack case 1100.)

Here, the inflow part 223 and the outflow part 225 of the battery module 100 may be configured to extend to the outside of the pack case 1100 when the battery module 100 is coupled to the pack case 1100. Thus, an interface for supplying and recovering coolant may be connected to the inflow part 223 and the outflow part 225, outside the pack case 1100, thereby preventing water from leaking from the pack case 1100.

Accordingly, an inflow hole 1110 and an outflow hole 1120 through which the inflow part 223 and the outflow part 225 penetrate, respectively, may be formed on the pack case 1100. More desirably, the inflow hole 1110 and the outflow hole 1120 may be configured in forms of slits cut downwardly from a top end of the pack case 1100. When the battery module 100 is configured as described above, the inflow part 223 and the outflow part 225 may be configured to be mounted in the inflow hole 1110 and the outflow hole 1120, through a process of mounting the battery module 100 downwardly from the upper side of the pack case 1100.

The above inflow part 223 and outflow part 225 may be configured to be securely fixed in the inflow hole 1110 and the outflow hole 1120 through a bolt assembly as shown in FIG. 7.

According to exemplary embodiments, it is possible to provide a battery module for a secondary battery configured as described above, and a battery pack that includes the battery module and that has a low height required in an electric vehicle. Also, it is possible to prevent a reduction in a performance of a battery by overcoming a decrease in a cooling performance that may occur when battery cells are horizontally stacked.

In particular, a heat sink for cooling a battery cell and a cooling fin in contact between battery cells may be coupled through a bolt assembly, and thus it is possible to prevent a gap between the heat sink and the cooling fin and to enhance a cooling performance based on ensuring of a contact reliability between the heat sink and the cooling fin.

In a flow path for flowing of a refrigerant of a heat sink, a flow path inside a case and a flow path outside the case may be formed integrally with each other, and accordingly an additional configuration for connecting the flow paths is not required. Also, it is possible to prevent a leakage of a refrigerant due to a leak of a connection part.

The cooling fin inserted between battery cells and a heat sink included on a side of the battery module may be fixed by bolting, as described above, and thus it is possible to secure a rigidity of the battery module.

A battery cell may be cooled using a water-cooling type heat sink, and thus it is possible to minimize a temperature deviation between a cell stacked in a lower end and a cell stacked in an upper end.

The present disclosure should not be construed to being limited to the above-mentioned exemplary embodiment. The present disclosure may be applied to various fields and may be variously modified by those skilled in the art without departing from the gist of the present disclosure claimed in the claims. Therefore, it is obvious to those skilled in the art that these alterations and modifications fall in the scope of the present disclosure.

100: Battery module
110: Battery cell
120: Cell frame
130: Module cover
140: Terminal
150: Terminal frame
160: Module cap
200: Cooling part
210: Cooling fin
220: Cooling body
1000: Battery pack
1100: Pack case

What is claimed is:

1. A battery module comprising:
a plurality of battery cells stacked in a vertical direction, wide faces to be positioned horizontally;
a plurality of cooling fins placed between the plurality of battery cells stacked in a vertical direction;
a cooling body assembled to be contact with the plurality of cooling fins at the both sides of the plurality of battery cells stacked in a vertical direction, and
a plurality of sub-modules stacked in a vertical direction, each sub-module comprises a cell frame, at least four battery cells of the plurality of battery cells arranged, within the cell frame, at least two in a horizontal direction and at least two stacked in the vertical direction, and at least one cooling fin of the plurality of cooling fins placed between the at least two stacked in the vertical direction, wherein each of the plurality of cooling fins comprises a horizontal part being in contact with the wide faces of the plurality of battery cells stacked in a vertical direction, and a vertical part formed at a first end of the horizontal part in vertical direction, a second end of the horizontal part opposing the first end is in physical contact with a neighboring cooling fin, vertical parts of the plurality of cooling fins are connected to the cooling body.

2. The battery module of claim 1, wherein the cooling fin and a cooling plate of the cooling body are coupled with a bolt.

3. The battery module of claim 2, wherein the bolt is fixed to the cooling fin by passing a space in which cooling pipes are not coupled on the cooling plate.

4. The battery module of claim 1, wherein the cooling body comprises:

a cooling plate coupled in contact with the cooling fin; and a cooling pipe through which the refrigerant is supplied and recovered and that is brazing-coupled to the cooling plate.

5. The battery module of claim 4, wherein the cooling plate is a heat sink.

6. The battery module of claim 4, wherein the cooling pipe comprises:

a plurality of main pipes disposed in a vertical direction; and sub-pipes that connect ends of the plurality of main pipes so that the plurality of main pipes are connected in series.

7. The battery module of claim 6, wherein in the cooling pipe, an inflow part that receives a supply of a refrigerant and an outflow part that recovers a refrigerant are individually formed, the inflow part is formed in a lowermost main pipe among the main pipes, and the outflow part is formed in an uppermost main pipe among the main pipes.

8. The battery module of claim 7, wherein a pair of cooling bodies are disposed on both side surfaces of a stacked battery cell, respectively, and the cooling body comprises:

an inflow part formed in an inflow end of a first cooling pipe disposed on one side surface of the battery cell;

an outflow part formed in an outflow end of a second cooling pipe disposed on another side surface of the battery cell; and a connection pipe that connects an outflow end of the first cooling pipe and an inflow end of the second cooling pipe.

9. The battery module of claim 8, wherein the inflow part is formed in a lowermost main pipe among main pipes of the first cooling pipe, the outflow part is formed in an uppermost main pipe among main pipes of the second cooling pipe, and the connection pipe connects an uppermost main pipe among the main pipes of the first cooling pipe and a lowermost main pipe among the main pipes of the second cooling pipe.

10. A battery pack for a secondary battery, the battery pack comprising:

the battery module of claim 1; and a pack case in which the battery module is accommodated.

11. The battery pack of claim 10, wherein the battery module comprises an inflow part in which a refrigerant flows, and an outflow part in which a refrigerant is recovered, and the inflow part and the outflow part are formed to extend so that an end portion of the battery module is exposed to the outside of the pack case when the battery module is accommodated in the pack case.

* * * * *

UNITED STATES PATENT AND TRADEMARK OFFICE
CERTIFICATE OF CORRECTION

Page 1 of 1

PATENT NO. : 12,315,901 B2
APPLICATION NO. : 17/952985
DATED : May 27, 2025
INVENTOR(S) : Young Sun Choi It is certified that error appears in the above-identified patent and that said Letters Patent is hereby corrected as shown below:

On the Title Page

Item (73) Assignee, Please change "SK INNOVATION CO., LTD." to --SK ON CO., LTD.--.

Signed and Sealed this
Twenty-second Day of July, 2025

Coke Morgan Stewart
*Acting Director of the United States Patent and Trademark Office*